(12) United States Patent
Imafuji (10) Patent No.: US 8,805,175 B2
(45) Date of Patent: Aug. 12, 2014

(54) INTERCHANGEABLE LENS, CAMERA BODY, AND CAMERA SYSTEM

(75) Inventor: Kazuharu Imafuji, Kawasaki (JP)

(73) Assignee: Nikon Corporation, Tokyo (JP)

( * ) Notice: Subject to any disclaimer, the term of this patent is extended or adjusted under 35 U.S.C. 154(b) by 37 days.

(21) Appl. No.: 13/033,152

(22) Filed: Feb. 23, 2011

(65) Prior Publication Data

US 2011/0317990 A1  Dec. 29, 2011

(30) Foreign Application Priority Data

Jun. 29, 2010 (JP) ................................. 2010-147811
Dec. 29, 2010 (JP) ................................. 2010-294515

(51) Int. Cl.
  *G03B 3/10* (2006.01)
  *G03B 13/34* (2006.01)
  *G03B 17/14* (2006.01)
  *H04N 5/232* (2006.01)

(52) U.S. Cl.
  CPC ............ *G03B 17/14* (2013.01); *H04N 5/23209* (2013.01)
  USPC .......................................... 396/133; 359/827

(58) Field of Classification Search
  CPC .................................... G03B 3/10; G02B 7/08
  USPC ................... 396/120, 125, 133; 359/704, 827
  See application file for complete search history.

(56) References Cited

U.S. PATENT DOCUMENTS

| 5,168,365 | A | * | 12/1992 | Kawahara ...................... 348/364 |
| 6,014,523 | A | | 1/2000 | Oono et al. |
| 6,097,896 | A | * | 8/2000 | Usui ................................ 396/55 |
| 2002/0106869 | A1 | | 8/2002 | Otsu et al. |
| 2004/0114251 | A1 | * | 6/2004 | Kaneda et al. ................. 359/694 |
| 2009/0245777 | A1 | * | 10/2009 | Shibuno et al. ................ 396/104 |
| 2011/0044682 | A1 | * | 2/2011 | Kawanami ...................... 396/439 |
| 2011/0080488 | A1 | | 4/2011 | Okamoto et al. |

FOREIGN PATENT DOCUMENTS

| JP | A-10-68871 | 3/1998 |
| JP | 10-197779 | 7/1998 |
| JP | A-2002-237515 | 8/2002 |
| JP | 2005-277564 A | 10/2005 |
| JP | 2010-026010 | 4/2010 |
| JP | A-2010-160174 | 7/2010 |
| JP | A-2010-200052 | 9/2010 |
| JP | A-2010-226666 | 10/2010 |
| JP | A-2010-237514 | 10/2010 |
| WO | WO 2009/139118 | 11/2009 |

OTHER PUBLICATIONS

Jan. 22, 2013 Office Action issued in Japanese Patent Application No. 2010-294515 (with translation).

* cited by examiner

*Primary Examiner* — Clayton E LaBalle
*Assistant Examiner* — Warren K Fenwick
(74) *Attorney, Agent, or Firm* — Oliff PLC (57) ABSTRACT

An interchangeable lens that is detachably fitted to a camera body includes: a photographic optical system including a plurality of driven members whose driven state changes; a driven position information transmission unit that transmits driven position information to the camera body via a first transmission unit according to a clock signal input from the camera body, the driven position information being related to a position of at least one driven member among the plurality of driven members; and a type information transmission unit that transmits type information to the camera body via a second transmission unit that is different from the first transmission unit, the type information specifying a type of driven position information that can be transmitted from the driven position information transmission unit.

15 Claims, 6 Drawing Sheets

INTERCHANGEABLE LENS, CAMERA BODY, AND CAMERA SYSTEM

INCORPORATION BY REFERENCE

The disclosures of the following priority applications are herein incorporated by references:

Japanese Patent Application No. 2010-147811 filed Jun. 29, 2010

Japanese Patent Application No. 2010-294515 filed Dec. 29, 2010

BACKGROUND OF THE INVENTION

1. Field of the Invention

The present invention relates to an interchangeable lens, to a camera body, and to a camera system.

2. Description of Related Art

Generally, with a camera system in which lenses can be interchanged, within each interchangeable lens, there is provided at least one drivable optical member whose driven state changes, and this may for example be a lens for focus adjustment or the like. For various types of control, the camera body needs information related to the driven state of this type of driven member (i.e. related to the state to which the driven member is currently driven). For example, in the camera system described in Japanese Laid-Open Patent Publication Heisei 10-68871 (Patent Document #1), an encoder that monitors the movement of a lens shifting system is provided. A signal that monitors the amount by which the lens is driven is outputted by this encoder, and is fed back to a lens drive control CPU via lens side contact points provided upon a mounting portion of the lens and body side contact points provided on a mounting portion of the body, with the body side contact points corresponding to these lens side contact points. Moreover, with the camera system described in Patent Document #1, a main CPU within the camera body and a lens CPU within the photographic lens and so on are coupled together by other contact points, different from those that transmit the monitor signal described above. The main CPU receives information needed for controlling camera sequencing and exposure operation and so on from the other CPU and so on, and sends information needed for camera sequencing to the other CPU. In other words, these contact points are contact points for performing general purpose communication between the main CPU and the lens CPU.

SUMMARY OF THE INVENTION

With the camera system described in Patent Document #1, the information related to the positions to which the various members are driven is always transmitted. Accordingly unnecessary communication is undesirably performed even when the camera body does not require this information related to the driven positions, and there has been the problem that it may become impossible to perform satisfactory communication. Moreover, if transmission and reception of the information related to the various driven positions is performed by using the contact points for general purpose communication described above, it becomes necessary to transmit and receive much superfluous data, such as for example data that specifies that the driven position information is being requested and so on, in other words much unnecessary communication is undesirably performed, so that the problem arises that it may become impossible to perform satisfactory communication.

According to the 1st aspect of the present invention, an interchangeable lens that is detachably fitted to a camera body, comprises: a photographic optical system including a plurality of driven members whose driven state changes; a driven position information transmission unit that transmits driven position information to the camera body via a first transmission unit according to a clock signal input from the camera body, the driven position information being related to a position of at least one driven member among the plurality of driven members; and a type information transmission unit that transmits type information to the camera body via a second transmission unit that is different from the first transmission unit, the type information specifying a type of driven position information that can be transmitted from the driven position information transmission unit.

According to the 2nd aspect of the present invention, an interchangeable lens according to the 1st aspect may further comprise: a specifying information reception unit that receives specifying information that specifies the type of the driven position information from the camera body via the second transmission unit; and wherein the driven position information transmission unit transmits driven position information corresponding to the type specified in the specifying information.

According to the 3rd aspect of the present invention, the second transmission unit of an interchangeable lens according to the 2nd aspect may comprise: contact points for transmission that output the type information to the camera body; and contact points for reception that input the specifying information from the camera body, and that are different from the contact points for transmission.

According to the 4th aspect of the present invention it is preferred that the type information transmission unit of an interchangeable lens according to the 3rd aspect transmits the type information when the interchangeable lens is fitted to the camera body.

According to the 5th aspect of the present invention, it is preferred that in an interchangeable lens according to the 4th aspect, when the specifying information has been received a plurality of times by the specifying information reception unit, the driven position information transmission unit transmits the driven position information on the basis of the specifying information that has been received most recently.

According to the 6th aspect of the present invention, it is preferred that in an interchangeable lens according to the 1st aspect, the driven members are any ones of a focusing lens that performs focus adjustment of the photographic optical system, a blur correction lens that corrects image blur of the image of the photographic subject, and an iris diaphragm that adjusts the amount of light from the photographic subject that passes through the photographic optical system.

According to the 7th aspect of the present invention, it is preferred that in an interchangeable lens according to the 1st aspect, the first transmission unit includes a first information transmission path that transmits information from the interchangeable lens to the camera body; the second transmission unit includes a second information transmission path that transmits information from the interchangeable lens to the camera body and a third information transmission path that receives the information transmitted from the camera body; and the second transmission unit transmits driven position information for driven members among the plurality of driven members, the driven position information for driven members being not transmitted to the camera body via the first transmission section.

According to the 8th aspect of the present invention, the driven position information transmission unit of an interchangeable lens according to the 1st aspect may repeatedly transmit to the camera body only the driven position information corresponding to the types specified by the specifying information that has been received, according to a clock signal output repeatedly from the camera body.

According to the 9th aspect of the present invention, a camera body to which is detachably fitted an interchangeable lens that includes a photographic optical system including a plurality of driven members whose driven state changes, comprises: a clock signal generation unit that generates a clock signal and transmits it to the interchangeable lens; a driven position information reception unit that receives driven position information according to the clock signal from the interchangeable lens via a first information transmission path, the driven position information being related to a position of at least one driven member among the plurality of driven members; a type information reception unit that receives type information specifying a type of driven position information that the interchangeable lens is capable of transmitting from the interchangeable lens via a second information transmission path that is different from the first information transmission path; a decision unit that decides, for each of the types of driven position information specified by the type information, whether or not the driven position information corresponding to the type is required; and a specifying information transmission unit that transmits specifying information specifying the type of driven position information that the decision unit has decided are required to the interchangeable lens via the second information transmission path; and wherein the driven position information reception unit receives the driven position information of the types specified by the specifying information.

According to the 10th aspect of the present invention, the specifying information transmission unit of a camera body according to the 9th aspect may transmit the specifying information when the interchangeable lens is fitted to the camera body.

According to the 11th aspect of the present invention, the specifying information transmission unit of a camera body according to the 9th aspect may transmit the specifying information when the result of the decision by the decision unit has changed.

According to the 12th aspect of the present invention, it is preferred that in a camera body according to the 9th aspect, the driving information reception unit does not perform the reception of the driven position information via the first information transmission path when the type information reception unit has not received the type information from the interchangeable lens.

According to the 13th aspect of the present invention, a camera system comprising a camera body and an interchangeable lens that is detachably fitted to the camera body, comprises: a photographic optical system provided to the interchangeable lens and including a plurality of driven members whose driven state changes; a driven position information transmission unit provided to the interchangeable lens that, according to a clock signal output from the camera body, transmits driven position information to the camera body via a first information transmission path, the driven position information being related to a position of at least one driven member among the plurality of driven members; a driven position information reception unit provided to the camera body that receives the driven position information from the interchangeable lens via the first information transmission path; a type information transmission unit provided to the interchangeable lens that transmits type information to the camera body via a second information transmission path that is different from the first information transmission path, the type information specifying a type of driven position information that can be transmitted by the driven position information transmission means; a type information reception unit provided to the camera body that receives the type information from the interchangeable lens via the second information transmission path; a decision unit provided to the camera body that decides, for each of the types of driven position information specified by the type information that has been received, whether or not the driven position information corresponding to the type is required; a specifying information transmission unit provided to the camera body that transmits specifying information to the interchangeable lens via the second information transmission path, the specifying information specifying the type of driven position information that the decision unit has decided are required; and a specifying information reception unit provided to the interchangeable lens that receives the specifying information from the camera body via the second information transmission path; and wherein the driven position information transmission unit transmits the driven position information of the type designated in the specifying information that has been received.

According to the 14th aspect of the present invention, it is preferred that in a camera system according to the 13th aspect further comprises: an automatic focus adjustment unit provided to the camera body that performs automatic focus adjustment of the photographic optical system, and an actuation member that can set the ON/OFF state of the automatic focus adjustment unit; and wherein the decision unit decides upon the type of the driven position information that are required, on the basis of the set state of the actuation member.

According to the present invention, it is possible to perform satisfactory communication.

DESCRIPTION OF THE PREFERRED EMBODIMENTS

Embodiment 1

Figure 1:
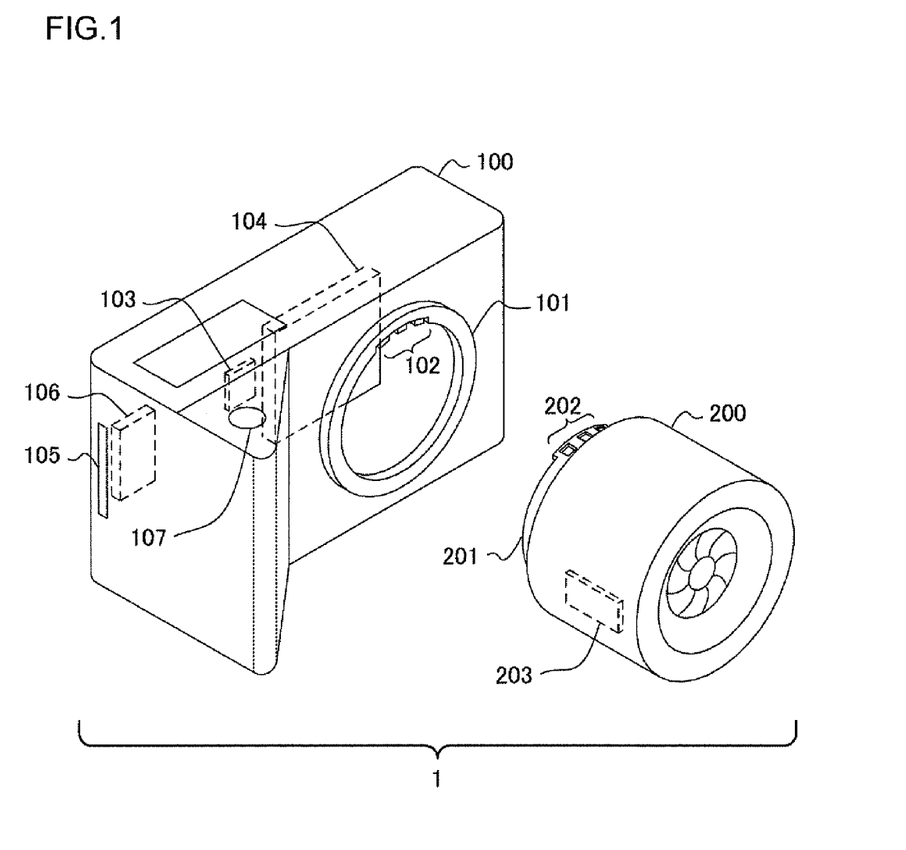
FIG. 1 is a perspective view showing the external appearance of a camera system according to a first embodiment of the present invention.

FIG. 1 is a perspective view showing the external appearance of a camera system according to a first embodiment of the present invention. This camera system 1 includes a camera body 100 and an interchangeable lens 200. The interchangeable lens 200 is fitted to the camera body 100 so as to be detachable. The fitting of the interchangeable lens 200 to the camera body 100 is performed by setting a lens side lens mount 201 of the interchangeable lens 200 into a body side lens mount 101 of the camera body 100.

A contact point group 102 that includes a plurality of contact points for data communication and power supply is provided in the neighborhood of the body side lens mount 101. A contact point group 202 that includes a plurality of contact points, each corresponding to one of the contact points in the camera body side contact points group 102, is provided in the neighborhood of the lens side lens mount 201. When the interchangeable lens 200 is fitted to the camera body 100, the contact point group 102 and the contact point group 202 are connected together, and, along with electrical power for operating the interchangeable lens 200 being supplied to the interchangeable lens 200 from the camera body 100, also it becomes possible for data communication to be performed between the camera body 100 and the interchangeable lens 200, as will be described hereinafter.

A body CPU 103 is provided in the camera body 100. Control of various sections within the camera body 100 is performed by this body CPU 103 executing a predetermined control program. A lens CPU 203 is provided in the interchangeable lens 200. Control of various sections within the interchangeable lens 200 is performed by this lens CPU 203 executing a predetermined control program, and moreover it executes initial communication processing, detection processing for driven position information, and transmission processing for driven position information, as will be described hereinafter.

An imaging element 104 captures an image of a photographic subject and outputs an image capture signal. When a release switch 107 provided to the camera body 100 is pressed, the body CPU 103 performs various types of image processing upon this image capture signal, and creates image data. This created image data is stored on a transportable storage medium 106 that is loaded into a storage medium insertion slot 105.

Figure 2:
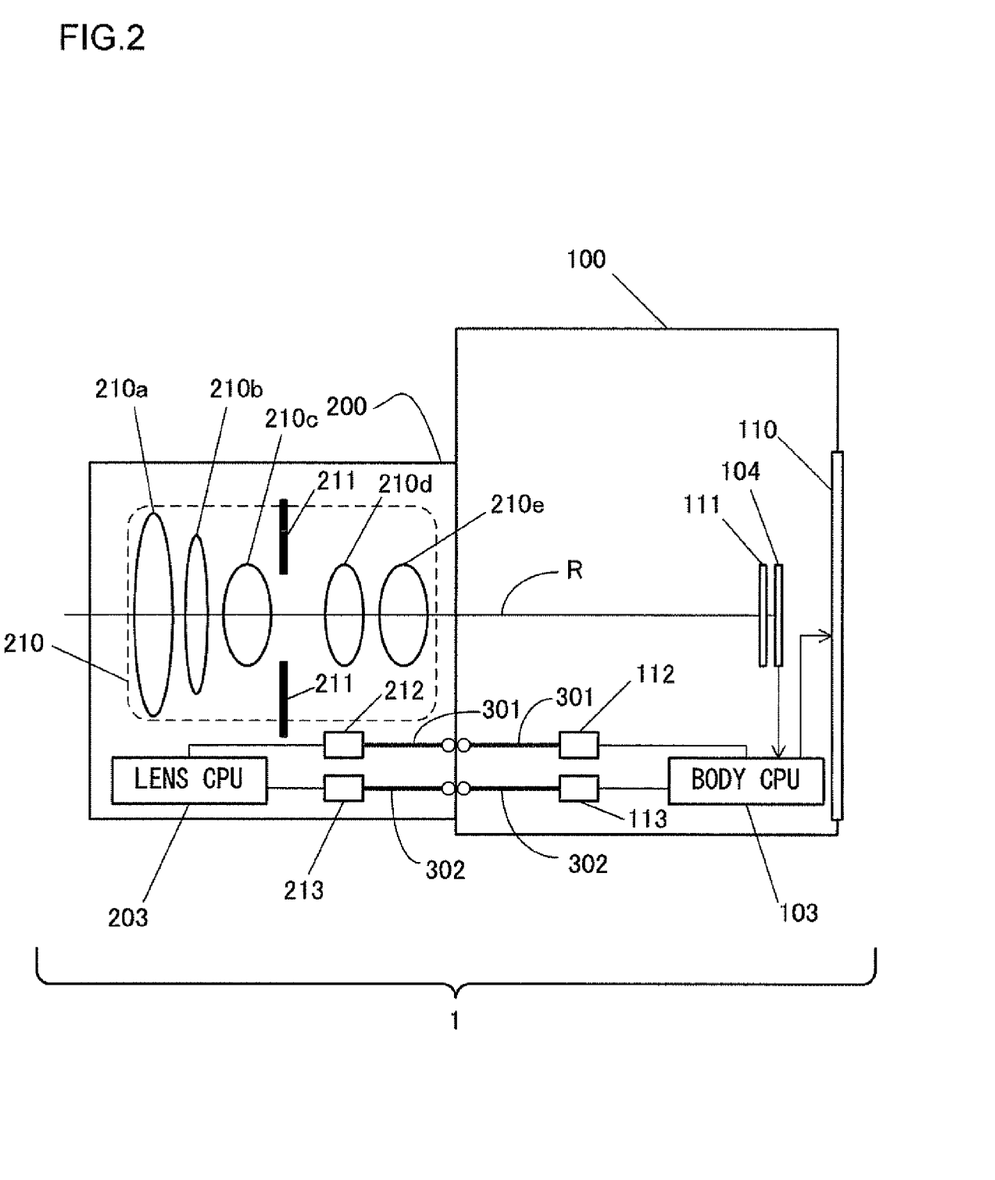
FIG. 2 is a sectional view showing the structure of a camera system 1 according to the first embodiment.

FIG. 2 is a sectional view showing the structure of this camera system 1 according to the first embodiment. The interchangeable lens 200 houses a photographic optical system 210 that includes a plurality of optical members and an iris diaphragm member. The driven members included in the photographic optical system 210 (i.e. optical members and an iris diaphragm member) are a plurality of lenses 210a through 210e and an iris diaphragm 211. This plurality of lenses includes a focusing lens 210c that performs focus adjustment of the photographic optical system 210 and a blur correction lens 210d that corrects for image blur of the image of the photographic subject.

It should be understood that, in the present invention, the driven members include not only the lenses 210a through 210e, but also other members that are present upon the photographic optical path and either pass or intercept the light flux from the photographic subject. For example the iris diaphragm 211, which adjusts the amount of light from the photographic subject that passes through the photographic optical system 210, is one of these driven members.

Drive systems (not shown in the figures) for driving each of the focusing lens 210c, the shake correction lens 210d, and the iris diaphragm 211 are installed within the interchangeable lens 200. For example, the focusing lens 210c may be driven by an ultrasonic motor. Moreover, the blur correction lens 210d may be driven by a two voice coil motor, and the iris diaphragm 211 may be driven by a stepping motor. The lens CPU 203 controls these drive systems, and changes the driven state of each of the optical members as appropriate.

It should be understood that it would also be acceptable for the interchangeable lens 200 to be built as a so-called power zoom lens, whose focal length can be varied as desired by electrically driving a focal length variation lens. In this case, along with providing this zoom lens (i.e., this focal length variation lens) within the interchangeable lens 200, also a zoom mechanism will be provided that makes it possible to drive this zoom lens electrically. And in this case the zoom lens is one of the driven members.

Filters 111 are installed upon the front surface of the imaging element 104, including an optical low pass filter and an infrared cutoff filter. Light from the photographic subject that has passed through the photographic optical system 210 in the interchangeable lens 200 is centered around the optical axis R, and is incident upon the imaging element 104 through these filters 111. The body CPU 103 creates an image for display from the image capture signal output by the imaging element 104, and displays this image upon an LCD module 110 that is installed upon the rear surface of the camera body 100.

Two transmission sections are provided between the body CPU 103 and the lens CPU 203, in other words between the camera body 100 and the interchangeable lens 200, via a contact point group 102 and a contact point group 202 shown in FIG. 1. Since these two transmission sections are mutually independent, even if data is being transmitted via one of the transmission sections it is still possible to transmit data via the other transmission section. In the following explanation, these two transmission sections will be termed the first transmission section 301 and the second transmission section 302. Furthermore, communication that is performed by using the first transmission section 301 will be termed "hot line communication", while communication that is performed using the second transmission section 302 will be termed "command and data communication". The signal lines included in the first transmission section 301 and in the second transmission section 302, and also the concrete details of the information communicated via command and data communication and via hot line communication, will be described in detail hereinafter.

A body side first communication circuit 112 that performs hot line communication and a body side second communication circuit 113 that performs command and data communication are installed within the camera body 100. Each of these circuits is connected to the body CPU 103. In a similar manner, a lens side first communication circuit 212 that performs hot line communication and a lens side second communication circuit 213 that performs command and data communication are installed within the interchangeable lens 200. Each of these circuits is connected to the lens CPU 203.

To put it in another manner, the body side first communication circuit 112 and the body side second communication circuit 113 are both communication interfaces on the body side, while the lens side first communication circuit 212 and the lens side second communication circuit 213 are both communication interfaces on the interchangeable lens side. The body CPU 103 and the lens CPU 203 control the above described communication interfaces on their respective sides, so as to perform the two types of communication (i.e. hot line communication and command and data communication).

It should be understood that while, in this embodiment, the two communication interfaces (one for hot line communication and one for command and data communication) are provided separately and independently from one another, as an alternative, it would also be acceptable to arrange for these to be made as one unified interface. Furthermore, instead of the separate body CPU 103 and lens CPU 203, it would also be acceptable to utilize a single CPU that functions to control both of these communication interfaces.

The body side first communication circuit 112 and the lens side first communication circuit 212 are mutually connected together by the first transmission section 301. In a similar manner, the body side second communication circuit 113 and the lens side second communication circuit 213 are mutually connected together by the second transmission section 302.

In addition to these members, an automatic focus adjustment device (not shown in the figures) that performs automatic focus adjustment of the photographic optical system 210 is installed within the camera body 100. This automatic focus adjustment device performs focus adjustment of the photographic optical system 210 automatically by transmitting appropriate drive commands for the focusing lens 210c to the lens CPU 203 via the body CPU 103.

Explanation of Command and Data Communication

Command and data communication is bidirectional communication that is performed using the second transmission section 302. Here, in this embodiment, this bidirectional communication of information includes both performing information communication from the camera body 100 to the interchangeable lens 200 using a dedicated unidirectional information transmission path, and also performing information communication from the interchangeable lens 200 to the camera body 100 using another unidirectional information transmission path that is provided separately from that information transmission path. In other words, the second transmission section 302 provides a total of two unidirectional information transmission paths: one unidirectional information transmission path from the camera body to the lens, and another unidirectional information transmission path from the lens to the camera body.

Moreover, apart from these two unidirectional information transmission paths, the second transmission section 302 also includes a dedicated clock signal transmission path for transmitting a clock signal that is used during command and data communication from the camera body 100 to the interchangeable lens 200. Furthermore, apart from these transmission paths, this second information transmission section 302 also has a signal line for notifying that command and data communication from the interchangeable lens 200 to the camera body 100 is permitted. Upon detection of change of the signal level of this signal line (i.e. change from high level to low level) the camera body starts transmission of the clock signal, and starts command and data communication. Although this is a matter of course, it should be understood that, for providing these information transmission paths, electrical contact points are provided both on the side of the camera body and also on the side of the interchangeable lens, individually corresponding to each of these information transmission paths.

In the command and data communication, data transmitted from the camera body 100 and data transmitted from the interchangeable lens 200 are synchronized to the same clock signal. In other words, data transmitted from the camera body 100 and data transmitted from the interchangeable lens 200 are transmitted simultaneously by the second transmission section 302. It should be understood that the body CPU 103 within the camera body 100 is adapted to generate a clock signal of a first predetermined frequency that is used for this command and data communication on a first predetermined cycle. Due to this, in command and data communication, the communication of information between the camera body 100 and the interchangeable lens 200 is performed on this first predetermined cycle.

The command and data communication is started by the body CPU 103. When the body CPU 103 starts command and data communication, first, predetermined data that specifies commands of various types is transmitted to the lens CPU 203. The lens CPU 203 interprets the data that it has received, and detects what types of commands are specified by that data. Thereafter the lens CPU 203 executes processing corresponding to these commands. For example, if a command to set the iris diaphragm 211 to some specified size has been received, the lens CPU 203 controls a stepping motor not shown in the figures, and sets the iris diaphragm 211 to the size that has been commanded.

Moreover, upon receipt of a command that requests information relating to the operational state of the lens CPU 203, the lens CPU 203 transmits this information to the body CPU 103 via the second transmission section 302. In other words, when the body CPU 103 needs to acquire information related to the interchangeable lens 200, first, data specifying a command to request that information must be transmitted from the first body CPU 103 to the interchangeable lens 200.

Among commands that are transmitted from the body CPU 103 by command and data communication, apart from the commands described above, there are also included commands to drive the focusing lens 210c and commands to use the shake correction lens 210d to set image shake correction to ON or OFF.

Explanation of Hot Line Communication

Hot line communication is communication in one direction performed by the body CPU 103 using the first transmission section 301. In this embodiment, this unidirectional communication is performed by using a dedicated unidirectional information transmission path for information from the interchangeable lens 200 to the camera body 100. In other words, the first transmission section 301 includes a unidirectional information transmission path from the lens to the camera body. Moreover, apart from this unidirectional information transmission path, the first transmission section 301 also includes a request signal line that transmits a signal (a so-called request signal) to the interchangeable lens 200 that requests permission for the start of hot line communication from the camera body 100 to the interchangeable lens 200. Furthermore, apart from the unidirectional information transmission path and the request signal line, the first transmission section 301 also includes an answer signal line that transmits an answer signal for permitting the start of hot line communication in response to this request signal. Yet further, the first transmission section 301 also includes a dedicated clock signal transmission path for transmitting a clock signal that is used during hot line communication from the camera body to the interchangeable lens 200. Hot line communication is started by the body CPU 103, in a similar manner to command and data communication. In concrete terms, hot line communication is started when, among the signal lines included in the first transmission section 301, the first body CPU 103 changes the signal level of the request signal line for starting communication and according thereto the lens CPU 203 changes the signal level of the answer signal line. Upon detection of this change of the signal level of the answer signal line, the body CPU 103 starts transmission of the clock signal. And, in response to this clock signal, the lens CPU 203 executes detection processing for the driven position information (to be described in detail hereinafter) and transmission processing for the driven position information (this will also be described in detail hereinafter) in that order. To put it in another manner, hot line communication is not started until the body CPU 103 changes the signal level of the request signal line that is the signal line for start of communication.

Here, the body CPU 103 within the camera body 100 is adapted to generate the clock signal at the first predetermined frequency that is used in this hot line communication (i.e. the clock signal that has already been described in connection with the command and data communication) on a second predetermined cycle. Here, this second predetermined cycle is set to a shorter cycle than the first predetermined cycle for the command and data communication described above (for example, the second predetermined cycle may be set to be an extremely short cycle having a period 1/10 of the period of the first predetermined cycle or less). Due to this, in hot line communication, information communication from the interchangeable lens 200 to the camera body 100 is performed at an extremely fast cycle (i.e. the second predetermined cycle) as compared to the command and data communication described above.

The body CPU 103 executes hot line communication on the predetermined cycle (i.e. on the above described second predetermined cycle). A way in which the hot line communication is different from the command and data communication is that the body CPU 103 is capable of receiving data related to the interchangeable lens 200 from the lens CPU 203 with very little processing. This is because, in contrast to the fact that it is first necessary to transmit data specifying a command to the lens CPU 203 when data is received by command and data communication, hot line communication is for transmission of data from the lens CPU 203 to be started immediately only by changing the signal level of specific signal lines (i.e. of the request signal line and the answer signal line).

Here, while in this embodiment it is arranged for clock signals of the same frequency (the clock signal of the first predetermined frequency described above) to be used by both the command and data communication and the hot line communication, this is not to be considered as being limitative of the present invention; it would also be possible for clock signals of two different frequencies to be used by these two different communication systems. For example, it would also be acceptable for the frequency of the clock signal that is used by hot line communication to be lower than the above described first frequency, provided that, when hot line communication is performed, information communication (i.e. transfer of data) between the interchangeable lens 200 and the camera body 100 is performed in sufficiently good time.

Explanation of the Driven Position Information

The interchangeable lens 200 of this embodiment includes a focusing lens 210c, a shake correction lens 210d, and an iris diaphragm 211, all of which are driven members whose state of driving changes. In the following explanation, information related to the positions of these three driven members that are optical members (i.e. information related to the position of the focusing lens 210c along the direction of the optical axis, to the position in the plane orthogonal to the optical axis of the shake correction lens 210d, and to the state of opening of the iris diaphragm 211, or to put it in another manner, to the position of the blades of the iris diaphragm) (or to put it in yet another manner, information related to the driven state of each of these driven members) will be termed "driven position information". This driven position information for the various driven members is detected by driven position information detection processing executed by the lens CPU 203. It should be understood that, as already described, if the interchangeable lens 200 is a power zoom lens, then a zoom lens by which this zooming is performed should also be considered as being a driven member.

Figure 3A:
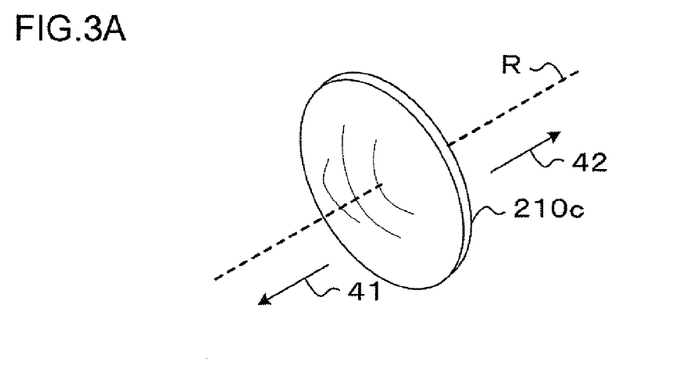
FIGS. 3A, 3B and 3C are figures showing driven position information for each of certain optical members.
Figure 3B:
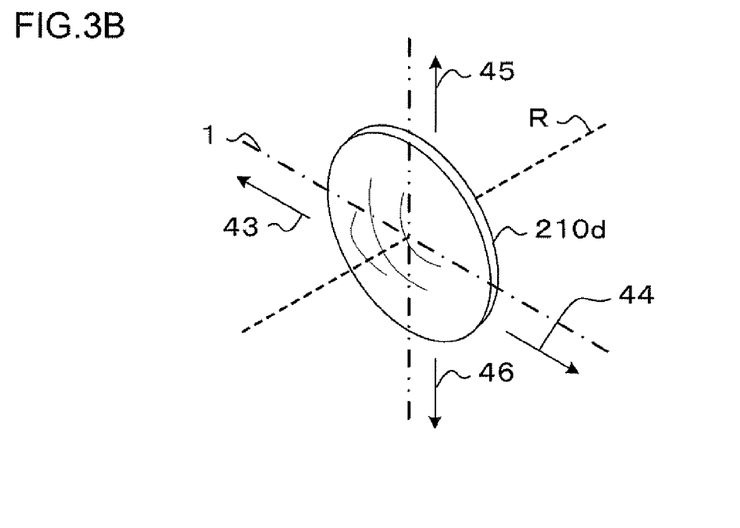
Figure 3C:
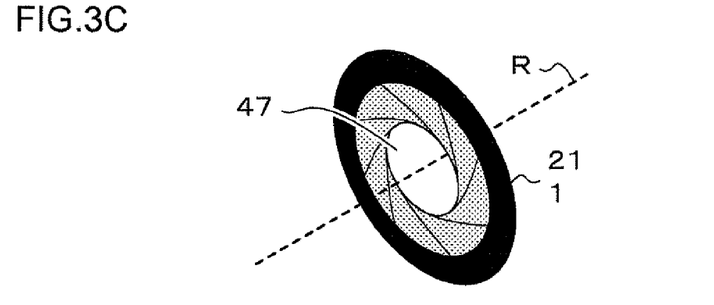

FIGS. 3A, 3B and 3C are figures showing the driven position information for each of the above optical members. As shown in FIG. 3A, the focusing lens 210c is driven along the optical axis R (i.e. along the direction of the optical axis). The lens CPU 203 detects the amount by which the focusing lens 210c is driven as being its driven position information. This driven amount of the focusing lens 210c is expressed by a 1-byte integer. This integer can take a value in the range −128 to +127, and, when the lens is driven in the direction shown by the arrow sign 41 (this is the direction towards the photographic subject) the driven amount is a positive integer, while when the lens is driven in the direction shown by the arrow sign 42 (this is the direction towards the camera body 100) the driven amount is a negative integer. This integer that specifies the driven amount of the focusing lens 210c expresses the position of the focusing lens 210c when the detection processing for the driven position information has been executed the previous time as being 0. In other words, the integer that is the driven position information for the focusing lens 210c specifies the magnitude of the amount of displacement from when detection processing was performed the previous time.

This driven amount of the focusing lens 210c is used by the automatic focus adjustment system for performing focus adjustment. The automatic focus adjustment device performs focus adjustment by a per se known technique, on the basis of change of the state of focusing of the focusing lens 210c and the driven amount of the focusing lens 210c.

As shown in FIG. 3B, the blur correction lens 210d is driven along a horizontal axis 43-44 and a vertical axis 45-46, both of which are orthogonal to the optical axis R. It should be understood that this blur correction lens 210d need not necessarily be moved in directions that are orthogonal to the optical axis R; it would also be possible to attain the objectives of blur correction by moving it in directions that include a component along the direction of the optical axis 43-44 and axis 45-46 (i.e. in shift directions that include components along the direction of the optical axis). The lens CPU 203 detects the driven amount of the blur correction lens 210d as being its driven position information. This driven amount of the blur correction lens 210d is expressed by two 1-byte integers, one of which (the horizontally driven amount) specifies the driven amount along the horizontal axis 43-44, and the other of which (the vertically driven amount) specifies the driven amount along the vertical axis 45-46. Each of these driven amounts can take a value in the range −128 to +127. The horizontally driven amount has a positive value for a displacement along the direction of the arrow sign 43, and a negative value for a displacement along the direction of the arrow sign 44. In a similar manner, the vertically driven amount has a positive value for a displacement along the direction of the arrow sign 45, and a negative value for a displacement along the direction of the arrow sign 46. In a similar manner to the case with the driven position information of the focusing lens 210c, the driven position information of the shake correction lens 210d also specifies the magnitudes of the amounts of displacement from when the detection processing for the driven position information was executed the previous time.

The amount by which the blur correction lens 210d is driven is employed by the automatic focus adjustment device for performing focus correction. Image blur correction using the blur correction lens 210d is performed by driving the blur correction lens 210d on the basis of the amount by which the interchangeable lens 200 is shaken, and by thus changing the optical axis of the photographic optical system 210. And due to this changing of the optical axis sometimes it happens that, from the focused state, the photographic optical system 210 is somewhat disturbed away from the focused state, or the like. In such a case, the automatic focus adjustment device utilizes the driven amount of the blur correction lens 210d in order to perform minute adjustment of the focused state.

The iris diaphragm that is disposed upon the optical axis R is shown in FIG. 3C. This iris diaphragm 211 is driven so as to vary the size of its aperture through which the ray bundle from the photographic subject passes (this is an aperture that is centered upon the optical axis R). The iris diaphragm 211 has an aperture area 47 that is defined by a plurality of iris diaphragm blades. The lens CPU 203 detects the size of this aperture area 47 as being its driven position information. In a similar manner to the case with the other optical members, this driven position information of the iris diaphragm 211 also specifies the magnitude of the amount of displacement from when the detection processing for the driven position information was executed the previous time. This driven position information is expressed by a 1-byte integer that can take a value in the range −128 to +127. This integer gives the amount of change of the opening of the iris diaphragm 211 in terms of f-stop, and has a positive value when the iris diaphragm 211 is closed down and a negative value when the iris diaphragm 211 is opened up. This integer is detected in steps of $\frac{1}{12}$ f-stop, so that, if for example the iris diaphragm 211 is closed down by $\frac{1}{12}$ of an f-stop from the previous time this detection was performed, the lens CPU 203 detects the integer +1 as being the driven position information for the iris diaphragm 211.

This driven amount of the iris diaphragm 211 is employed by the body CPU 103 for detecting the state of the iris diaphragm 211. From when the body CPU 103 transmits a drive command for the iris diaphragm 211 to the lens CPU 203, until the driving of the iris diaphragm 211 is actually finished, there is a time lag that corresponds to the state of the interchangeable lens 200. Since it is difficult to estimate this time lag accurately, generally the body CPU 103 only performs subsequent processing after it is possible to be confident, by waiting after the drive command is transmitted for a time period that is considered to be sufficiently longer than this time lag, that the driving of the iris diaphragm 211 has reliably been completed. However in this embodiment it is not necessary to wait for any excessive time, since, by obtaining the driven amount of the iris diaphragm 211, the body CPU 103 is able reliably to detect that the iris diaphragm 211 has closed down or opened up to the size that was commanded.

Explanation of the Initial Communication Processing

When the interchangeable lens 200 is fitted with the camera body 100 in the power supply ON state, supply of electrical power to the interchangeable lens 200 is started. At this time, the body CPU 103 and the lens CPU 203 start performing initial communication processing to perform transfer of required data between the interchangeable lens 200 and the camera body 100.

Figure 4A:
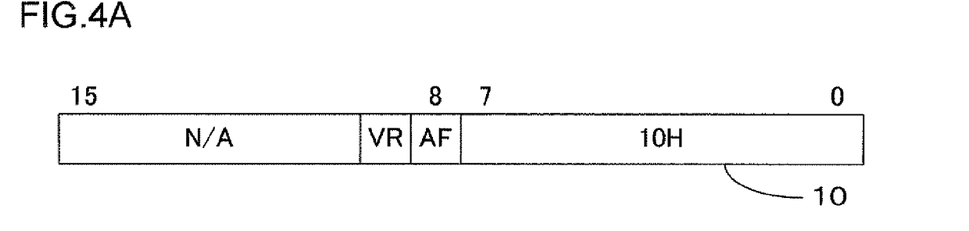
FIGS. 4A, 4B and 4C are figures showing an example of data transmitted and received by command and data communication during initialization of an interchangeable lens 200.
Figure 4B:
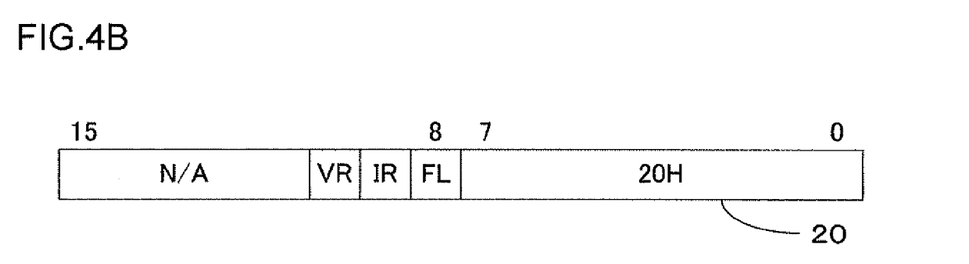
Figure 4C:
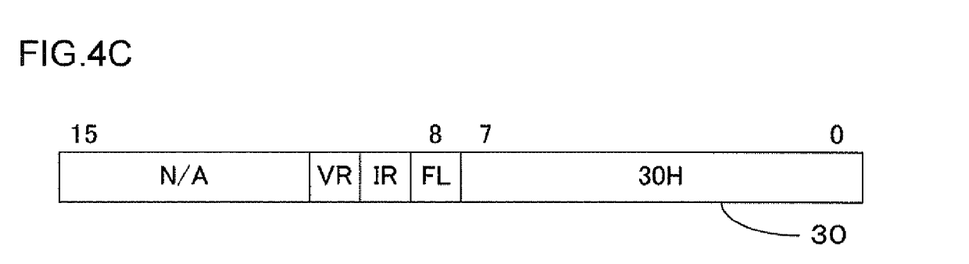

FIGS. 4A, 4B and 4C are figures showing examples of data transmitted and received by command and data communication during this initial communication with the interchangeable lens 200. In initial communication processing, various types of data needed for control of the interchangeable lens 200 are transmitted and received by command and data communication.

In the initial communication processing, the lens CPU 203 transmits the special data 10 shown in FIG. 4A to the body CPU 103. This special data 10 is two bytes of data, of which the lower byte is a special value indicating that this data is special data. The body CPU 103 looks at the lower byte of this data that it has received, and recognizes that the data is special data. And each bit of the higher byte of the special data 10 corresponds to a function of some type of which the interchangeable lens 200 may be capable. In the case shown in FIG. 4A, for example, the eighth bit (AF) of the special data 10 corresponds to the automatic focus adjustment function, while the ninth bit (VR) corresponds to the blur correction function. If the value of any particular one of these bits is 1, this interchangeable lens 200 is endowed with that function. It should be understood that bits marked in FIGS. 4A, 4B and 4C with "N/A" are bits for which no particular meaning is prescribed in this embodiment. In other words, these bits may have any value.

After having transmitted the special data 10, next, the lens CPU 203 transmits type data 20 shown in FIG. 4B to the body CPU 103. This type data 20 is two bytes of data specifying the types of driven position information that the lens CPU 203 is capable of transmitting, and, in a similar manner to the special data 10, its lower byte is a special value that indicates that this is type data. And the higher byte of the type data 20 specifies the types of driven position information that the interchangeable lens 200 is capable of transmitting by hot line communication. In concrete terms, each of its bits corresponds to a type of driven position information that it might be possible to transmit, and, if the value of a bit is 1, this means that the lens CPU 203 is capable of transmitting driven position information of the type that corresponds to that bit.

For example, in FIG. 4B, the eighth bit (FL) of the type data 20 corresponds to the driven amount of the focusing lens 210c per unit time, the ninth bit (IR) corresponds to the driven amount of the iris diaphragm 211 per unit time, and the tenth bit (VR) corresponds to the driven amount of the blur correction lens 210d per unit time. By referring to the bits of the type data 20 that has been received, the body CPU 103 is able to recognize which types of driven position information the interchangeable lens 200 is capable of transmitting by hot line communication.

Having received the type data 20, the body CPU 103 performs decision processing and, for each of the various types of driven position information that the interchangeable lens 200 is capable of transmitting, makes a decision as to whether or not the body CPU 103 needs the driven position information of that type. And the body CPU 103 transmits to the lens CPU 203 indicator data 30 designating the types of driven position information that the body CPU 103 has decided are required in this decision processing. This designation data 30 is two bytes of data, and, in a similar manner to the special data 10 and the type data 20, its lower byte is a special value that indicates that this is designation data. And the higher byte of the designation data 30 specifies the types of driven position information that are to be transmitted from the interchangeable lens 200 by hot line communication. In concrete terms, in a similar manner to the case with the type data 20, each of the bits corresponds to a type of driven position information, and, if a bit is 1, this means that the body CPU 103 requests transmission of the driven position information of the type that corresponds to that bit.

For example, in FIG. 4C, the eighth bit (FL) of the type data 20 corresponds to the driven amount of the focusing lens 210c per unit time, the ninth bit (IR) corresponds to the driven amount of the iris diaphragm 211 per unit time, and the tenth bit (VR) corresponds to the driven amount of the blur correction lens 210d per unit time. For example, if the user has set the camera body 100 to the auto focus mode, then the automatic focus adjustment device within the camera body 100 needs to know the driven amount of the focusing lens 210c in order to perform automatic focus adjustment. Accordingly, in the decision processing described above, the body CPU 103 decides that the driven amount of the focusing lens 210c is needed. And therefore the body CPU 103 transmits designation data 30 in which the eighth bit is 1 to the interchangeable lens 200. Conversely, if the camera body 100 is set to the manual focus mode, the camera body 100 does not need the driven amount of the focusing lens 210c, since the automatic focus adjustment device is not going to operate. Thus the body CPU 103 transmits designation data 30 in which the eighth bit is 0 to the interchangeable lens 200.

In the decision processing, the body CPU 103 decides that driven position information is not needed in the following types of case. For example, if the interchangeable lens 200 is a new interchangeable lens that has been manufactured more recently than the camera body 100, and is capable of transmitting driven position information of a new type that cannot be taken into account by the camera body 100, then the body CPU 103 decides that the driven position information of that type is useless, since the camera body 100 does not know any way to use driven position information of that type. Furthermore, if the camera body 100 is a low priced type of camera body that only has restricted functions, there is a possibility that this camera body 100 is not endowed with any high level control function that can utilize driven position information of some specific type. In this type of case as well, the driven position information of that type is not required.

As described above, when the interchangeable lens 200 is fitted to the camera body 100, the lens CPU 203 transmits type data that specifies the types of driven position information that the lens CPU 203 is capable of transmitting.

Now, the operation of the camera body 100 (i.e. of the body CPU 103) will be explained, in the case that it has not been possible to perform the transmission of the type data 20 from the interchangeable lens 200 to the camera body 100.

If during the initial communication it has not been possible for the body CPU 103 to obtain the type data 20 described above from the interchangeable lens 200, the body CPU 103 is not able to recognize what types of driven position information the interchangeable lens 200 that is mounted to the camera body 100 is capable of transmitting by using hot line communication. In this case, the body CPU 103 does not transmit the designation data 30 described above to the interchangeable lens 200. Furthermore, the body CPU 103 does not perform changing of the signal level of the request signal line that is the signal line for starting hot line communication, and due to this the body CPU 103 does not start hot line communication with the lens CPU 203 of the interchangeable lens 200 that is fitted. In other words, the camera body 100 does not perform hot line communication with an interchangeable lens 200 that finds itself in this type of state (i.e. in the state in which the type data 20 cannot be transmitted to the camera body 100).

Explanation of the Processing for Detection of the Driven Position Information

After the initial communication processing has ended, the body CPU 103 requests the lens CPU 203 to start hot line communication on the predetermined cycle. Upon receipt of this hot line communication start request from the camera body 100, the lens CPU 203 executes detection processing for the driven position information. A start request for hot line communication is meant change of the signal level of a specified signal line, as previously mentioned.

The detection processing for the driven position information is processing for detecting the driven position information for each of the optical members to be transmitted to the body CPU 103. In other words, for bits in the designation data 30 that was transmitted by the body CPU 103 in the initial communication processing described above whose values were 0, the corresponding driven position information is not detected.

Explanation of the Processing for Transmitting the Driven Position Information

Having executed the detection processing for the driven position information, the lens CPU 203 then executes transmission processing for the driven position information. In this transmission processing for the driven position information, the various items of driven position information that were detected by the detection processing for the driven position information are transmitted by the lens CPU 203 to the body CPU 103.

Figure 5A:
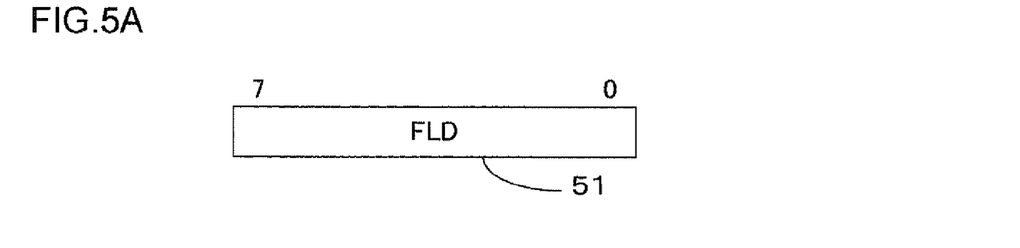
FIGS. 5A, 5B, 5C, 5D, 5E are figures showing the data format of the driven position information.
Figure 5B:
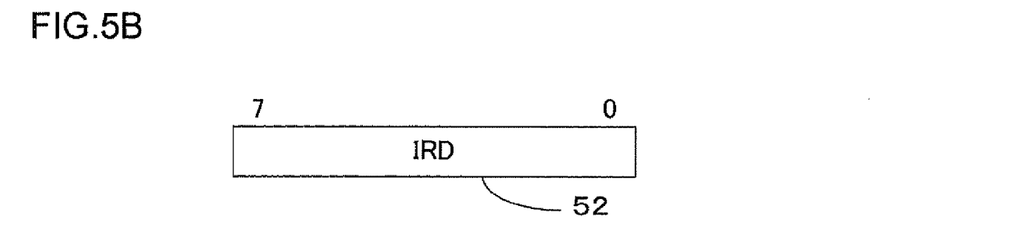
Figure 5C:
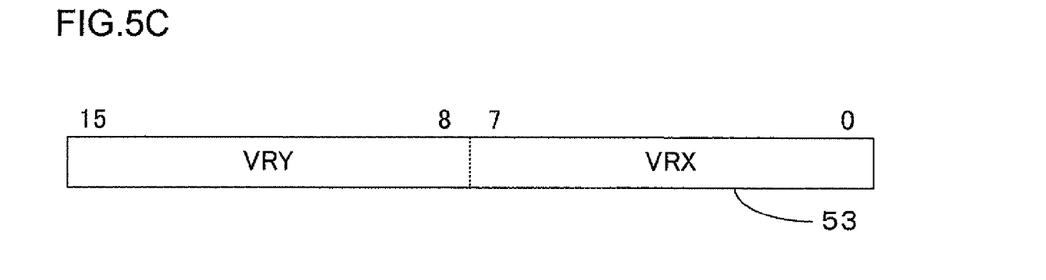

FIGS. 5A through 5E are figures showing the data format for the driven position information. In FIGS. 5A through 5C, there are shown FL data 51 that specifies the driven amount of the focusing lens 210c, IR data 52 that specifies the driven amount of the iris diaphragm 211, and VR data 53 that specifies the driven amount of the blur correction lens 210d. Since, as previously described, the driven amount of the focusing lens 210c and the driven amount of the iris diaphragm 211 are both detected as 1-byte integer values, accordingly, as shown in FIGS. 5A and 5B, the FL data 51 and the IR data 52 are both one byte in size.

Furthermore, the driven amount of the blur correction lens 210d is detected as two 1-byte integers, one for the driven amount in the horizontal direction and the other for the driven amount in the vertical direction. Corresponding to this, as shown in FIG. 5C, the VR data 53 is detected as two bytes of data, of which the lower byte is the driven amount VRX in the horizontal direction and the higher byte is the driven amount VRY in the vertical direction.

The lens CPU 203 links together these various items of data in a predetermined order, and thereby constructs data for transmission to be transmitted to the body CPU 103 by hot line communication. Since, as previously described, in the detection processing for the driven position information, the body CPU 103 does not detect driven position information items of the type or types that it has been decided are useless, accordingly only driven position information items of the types that it has been decided are needed by the CPU 103 are included in the data for transmission.

Figure 5D:
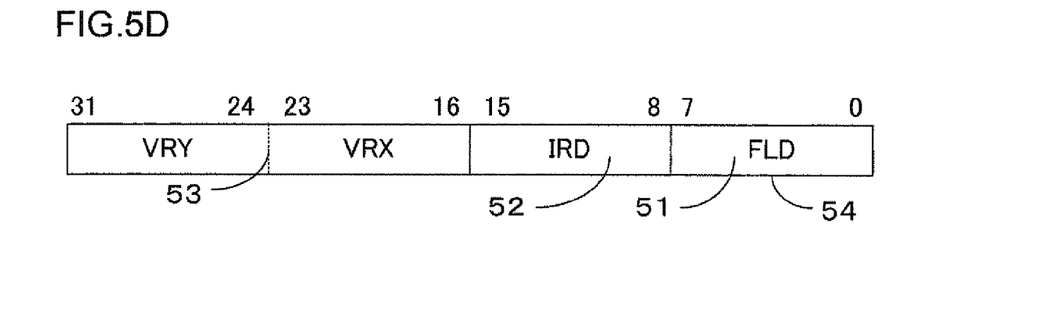
Figure 5E:
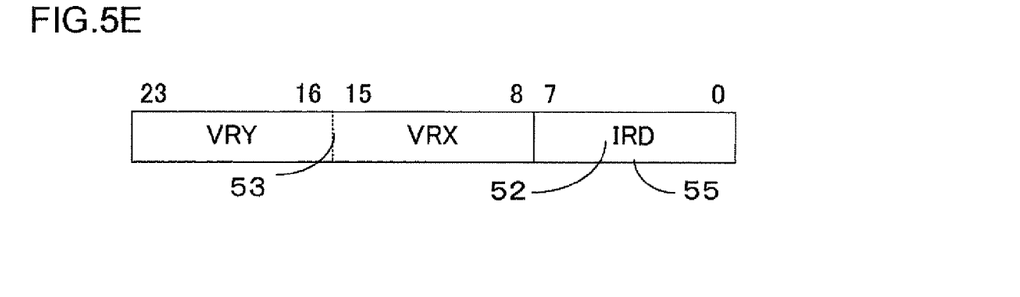

For example, FIG. 5D is a figure showing the data for transmission 54 when, in the designation data 30 transmitted from the body CPU 103, all of the items of driven position information were designated as being required. The lens CPU 203 creates driven position information including the items of the types that were designated as needed by the body CPU 103 by linking together the driven amount of the focusing lens 210c, the driven amount of the iris diaphragm 211, and the driven amount of the blur correction lens 210d, in that order from the lowest byte. However, if for example the body CPU 103 had previously decided that only the driven amount of the focusing lens 210c is not required, then the data for transmission 55 shown in FIG. 5E is created. Conversely, if the body CPU 103 had previously decided that only the driven amount of the focusing lens 210c is required, the data for transmission 51 shown in FIG. 5A is created.

As described above, according to the clock signal described above generated by the camera body 100, the lens CPU 203 repeatedly transmits to the camera body, via the first transmission section 301, only those items of the driven position information that were specified in the designation data 30. It should be understood that, if a transmission request arrives from the camera body side via command data communication related to some item of driven position information that was not specified in the designation data 30, the lens CPU 203 transmits it to the camera body 100 by command data communication (via the second transmission section 302 described above, on the first predetermined cycle described above according to the clock signal described above).

With the camera system according to the first embodiment described above, the following beneficial operational advantages are obtained.

(1) In the initial communication processing, the lens CPU 203 transmits the type data 20 specifying the driven position information that can be transmitted to the camera body 100 via the second transmission section 302. The body CPU 103 performs decision processing on the basis of this type data 20, and transmits to the interchangeable lens 200 the designation data 30 that specifies only the types of driven position information that are required. The lens CPU 203 repeatedly transmits to the camera body 100 via the first transmission section 301, only those types of driven position information that were specified in the designation data 30. Since this is done, no superfluous communication is generated during transmission and reception of the driven position information, and it is possible to perform transmission and reception of only that driven position information that is desired. Moreover, by arranging for the lens CPU 301 repeatedly to transmit to the camera body 100 via the first transmission section 301 only those types of driven position information that were specified by the designation data 30, it is possible to perform transmission and reception o the driven position information with the minimum possible amount of communication.

(2) The lens CPU 203 transmits the type data 20 when the interchangeable lens 200 has been fitted to the camera body 100. Moreover, the body CPU 103 transmits the designation data 30 when the interchangeable lens 200 has been fitted to the camera body 100. Since this is done, it is possible for the body CPU 103 to start the acquisition of the driven position information rapidly after the interchangeable lens 200 has been fitted.

(3) The lens CPU 203 transmits the types of driven position information that have been specified by the designation data 30 by using the first transmission section 301 that is specialized for communication of the driven position information. Since this is done, there is no decrease of the responsiveness of communication of the driven position information due to congestion of communication via the second transmission section 302, or the like.

(4) The body CPU 103 requests the start of hot line communication, not by transmitting data specifying a communication request to the lens CPU 203, but rather by changing the signal level of a specific signal line. Since this is done, the transmission request for the driven position information does not generate any superfluous communication.

(5) If a plurality of types of driven position information have been specified by the designation data 30, the lens CPU 203 transmits these plurality of types of driven position information by hot line communication. Since this is done, even if for example the number of types of driven position information is to be increased, it will be sufficient to arrange to change the details of the transmitted data in an appropriate manner, and no added signal line or encoder or the like is required as was the case with certain examples of the prior art.

(6) If the camera CPU 103 is not able to receive the type data 20 from the interchangeable lens 200, it performs control so as not to perform hot line communication with this interchangeable lens 200. Due to this, such useless communication with an interchangeable lens with which hot line communication is not possible is not even started, and thus it is possible to reduce the consumption of electrical power.

Embodiment 2

Figure 6:
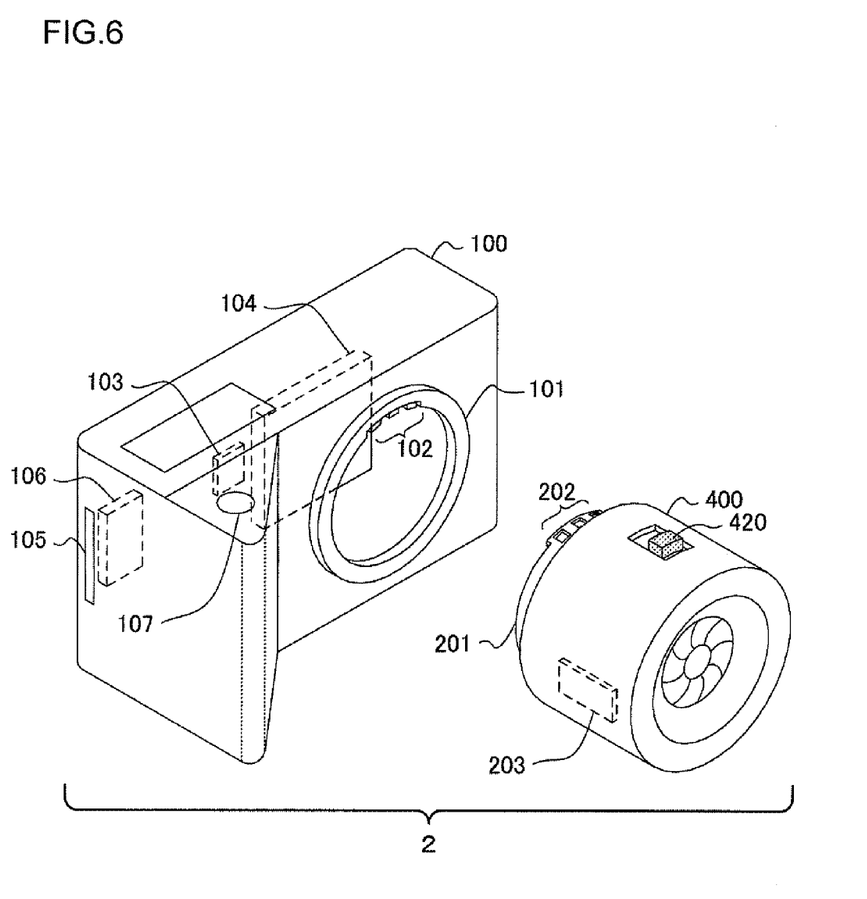
FIG. 6 is a perspective view showing the external appearance of a camera system according to a second embodiment of the present invention.

FIG. 6 is a perspective view showing the external appearance of a camera system according to a second embodiment of the present invention. This camera system 2 includes a camera body 100 and an interchangeable lens 400. It should be understood that, in the following explanation, to circuits and devices that are the same as in the case of the camera system 1 according to the first embodiment, the same reference symbols are appended, and explanation thereof is omitted.

The interchangeable lens 400 according to this second embodiment includes a switch 420 that can set an automatic focus adjustment device (not shown in the figures) installed to the camera body 100 to ON or to OFF. The body CPU 103 is capable of acquiring the set state of the switch 420 via the command and data communication. And the body CPU 103 acquires the set state of the switch 420 on a predetermined cycle.

When the user actuates the switch 420, the body CPU 103 detects that the set state of the switch 420 has changed. And the ON/OFF state of the automatic focus adjustment device is changed over according to that set state. As previously described, the driven amount of the focusing lens 210c is utilized by the automatic focus adjustment device. Accordingly, if the automatic focus adjustment device is OFF, it is decided that the driven amount of the focusing lens 210c is not necessary for the decision processing performed by the body CPU 103. In other words, the necessity or otherwise of the driven position information related to the focusing lens 210c changes according to the set state of the switch 420.

When the set state of the switch 420 changes, the body CPU 103 executes decision programming again. And the designation data 30 is created again on the basis of the decision result, and is transmitted to the lens CPU 203 again. If designation data 30 is received by the lens CPU 203 again after the initial communication processing, the lens CPU 203 performs creation of the data for transmission and transmission thereof on the basis of the designation data 30 that has been received most recently.

In addition to the beneficial operational advantages obtained with the camera system according to the first embodiment, the camera system according to the second embodiment of the present invention described above also provides the following beneficial operational advantages.

(1) If the lens CPU 203 has received designation data 30 a plurality of times, it transmits driven position information on the basis of the designation data 30 that was received most recently. Since this is done, it is always possible for the camera body 100 to receive only the appropriate driven position information.

(2) The body CPU 103 transmits the designation data 30 when the result of the decision according to the decision processing has changed. Since this is done, it is possible, if the necessity or otherwise of the driven position information has changed, rapidly to change the contents communicated by the hot line communication, so that the body CPU 103 is able to receive only driven position information of the appropriate type.

(3) The body CPU 103 decides upon the necessity or otherwise of the various types of driven position information on the basis of the set state of the switch 420 that can set the ON/OFF state of the automatic focus adjustment device. Since this is done, it is possible rapidly to change the contents communicated by the hot line communication, if the necessity or otherwise of the driven amount of the focusing lens 210c has changed.

The following variations are also within the scope of the present invention, and moreover one or more of the following variant embodiments may be combined with the embodiments described above.

Variant Embodiment 1

In the first embodiment it would also be acceptable to arrange for the camera body 100 to send the designation data 30, when the driven position information that the interchangeable lens 200 can transmit is not utterly necessary for the camera body 100. Furthermore, it would also be acceptable to arrange to adapt the body CPU 103 so that it decides that the driven position information is necessary in the decision processing, even if it is driven position information that is not utilized by the camera body 100.

Variant Embodiment 2

It would also be acceptable to arrange for driven position information of two or more types to be present for a single driven member. For example while, in the first embodiment, the VR data 53 that specifies the driven amount of the blur correction lens 210$d$ is made up of a horizontally driven amount VRX and a vertically driven amount VRY, it would also be acceptable to arrange for these two driven amounts to be handled as individual items of driven position information. Moreover, it would also be acceptable to arrange for two or more items of driven position information to be present for a single driven member (optical member), even though their classifications or the ways in which they are used are utterly different. For example, in the first embodiment, apart from the FL data 51 that specifies the driven amount of the focusing lens 210$c$, it would also be acceptable to make it possible to utilize a data item that specifies the drive speed of the focusing lens 210$c$.

Variant Embodiment 3

It may be arranged to perform the initial communication processing at any appropriate timing. For example, it would be acceptable to arrange for the initial communication processing to be performed upon attachment of the interchangeable lens 200, even when the camera body 100 is in the power supply OFF state; or it would be possible to arrange for it to be executed when the power supply to the camera body 100 is turned to ON, if the interchangeable lens 200 is fitted.

Variant Embodiment 4

The format in which the driven position information is expressed is not to be considered as being limited to the format explained in connection with the first embodiment. For example, it would also be acceptable to express the driven amount of each of the optical members as an integer that specifies the absolute position of that optical member, or to express it as an integer of two or more bytes, or as a floating point number. The same holds for the special data 10, the type data 20, and the designation data 30.

Variant Embodiment 5

The way in which each of the items of the driven position information is employed may be different from that explained in connection with the first embodiment. For example, it would also be acceptable to arrange for the driven amount of the focusing lens 210$c$ to be employed by some device other than an automatic focus adjustment device.

Variant Embodiment 6

It would also be acceptable to arrange for the body CPU 103 to perform control so as not to perform hot line communication, not only when it has not been possible to receive the type data 20 from the interchangeable lens 200, but also when it has not been possible to receive the special data 10 from the interchangeable lens 200.

Variant Embodiment 7

If the interchangeable lens 200 is a power zoom lens as described above, it would also be acceptable to arrange to provide information that specifies this fact in the special data 10 and/or in the type data 20.

Variant Embodiment 8

In the embodiments described above, if it is not possible for the body CPU 103 to obtain the type data 20 described above from the interchangeable lens 200 during the initial communication, it is arranged for the body CPU 103 not to perform hot line communication with the interchangeable lens 200. In this type of case, it would also be acceptable to arrange for the body CPU 103 to output a warning display to the user. For example, a message such as "Refit Interchangeable Lens" or the like may be displayed upon a display screen (a rear surface LCD or the like) that is provided to the camera body 100.

Variant Embodiment 9

In the embodiments described above it is described that, as a blur correction mechanism, the blur correction lens that is shiftable so as to have a component in a direction orthogonal to the optical axis R is provided, and camera blur correction is provided by driving this blur correction lens. However, the blur correction mechanism is not to be considered as being limited to this particular construction; it would also be acceptable to perform blur correction by rotating (swinging) the image blur correction optical system in the pitching direction and the yawing direction of the camera system.

Provided that the distinguishing features of the present invention are preserved, the present invention is not to be considered as being limited to the embodiments described above; other embodiments that are considered to be within the scope of the technical concept of the present invention are also included within its range.

What is claimed is:

1. An interchangeable lens that is detachably fitted to a camera body, comprising:
    a photographic optical system including a plurality of driven members whose driven state changes;
    a driven position information transmission unit that transmits driven position information to the camera body via a first transmission unit according to a clock signal input from the camera body, the driven position information being related to a position of at least one driven member among the plurality of driven members; and
    a type information transmission unit that transmits type information to the camera body via a second transmission unit that is different from the first transmission unit, the type information specifying a type of the driven member of which driven position information can be transmitted from the driven position information transmission unit.

2. An interchangeable lens according to claim 1, further comprising:
    a specifying information reception unit that receives specifying information that specifies the type of the driven position information from the camera body via the second transmission unit; and wherein
    the driven position information transmission unit transmits driven position information corresponding to the type specified in the specifying information.

3. An interchangeable lens according to claim 2, wherein the second transmission unit comprises:
    contact points for transmission that output the type information to the camera body; and
    contact points for reception that input the specifying information from the camera body, and that are different from the contact points for transmission.

4. An interchangeable lens according to claim 3, wherein the type information transmission unit transmits the type information when the interchangeable lens is fitted to the camera body.

5. An interchangeable lens according to claim 4 wherein when the specifying information has been received a plurality of times by the specifying information reception unit, the driven position information transmission unit transmits the driven position information on the basis of the specifying information that has been received most recently.

6. An interchangeable lens according to claim 1, wherein the driven members are any ones of a focusing lens that performs focus adjustment of the photographic optical system, a blur correction lens that corrects image blur of the image of the photographic subject, and an iris diaphragm that adjusts the amount of light from the photographic subject that passes through the photographic optical system.

7. An interchangeable lens according to claim 1, wherein:
the first transmission unit includes a first information transmission path that transmits information from the interchangeable lens to the camera body;
the second transmission unit includes a second information transmission path that transmits information from the interchangeable lens to the camera body and a third information transmission path that receives the information transmitted from the camera body; and
the second transmission unit transmits driven position information for driven members among the plurality of driven members, the driven position information for driven members being not transmitted to the camera body via the first transmission section.

8. An interchangeable lens according to claim 1, wherein the driven position information transmission unit repeatedly transmits to the camera body only the driven position information corresponding to the types specified by the specifying information that has been received, according to a clock signal output repeatedly from the camera body.

9. A camera body to which is detachably fitted an interchangeable lens that includes a photographic optical system including a plurality of driven members whose driven state changes, comprising:
a clock signal generation unit that generates a clock signal and transmits it to the interchangeable lens;
a driven position information reception unit that receives driven position information according to the clock signal from the interchangeable lens via a first information transmission path, the driven position information being related to a position of at least one driven member among the plurality of driven members;
a type information reception unit that receives type information specifying a type of driven position information that the interchangeable lens is capable of transmitting from the interchangeable lens via a second information transmission path that is different from the first information transmission path;
a decision unit that decides, for each of the types of driven position information specified by the type information, whether or not the driven position information corresponding to the type is required; and
a specifying information transmission unit that transmits specifying information specifying the type of driven position information that the decision unit has decided are required to the interchangeable lens via the second information transmission path; and wherein
the driven position information reception unit receives the driven position information of the types specified by the specifying information.

10. A camera body according to claim 9, wherein the specifying information transmission unit transmits the specifying information when the interchangeable lens is fitted to the camera body.

11. A camera body according to claim 9, wherein the specifying information transmission unit transmits the specifying information when the result of the decision by the decision unit has changed.

12. A camera body according to claim 9, wherein the driving information reception unit does not perform the reception of the driven position information via the first information transmission path when the type information reception unit has not received the type information from the interchangeable lens.

13. A camera system comprising a camera body and an interchangeable lens that is detachably fitted to the camera body, comprising:
a photographic optical system provided to the interchangeable lens and including a plurality of driven members whose driven state changes;
a driven position information transmission unit provided to the interchangeable lens that, according to a clock signal output from the camera body, transmits driven position information to the camera body via a first information transmission path, the driven position information being related to a position of at least one driven member among the plurality of driven members;
a driven position information reception unit provided to the camera body that receives the driven position information from the interchangeable lens via the first information transmission path;
a type information transmission unit provided to the interchangeable lens that transmits type information to the camera body via a second information transmission path that is different from the first information transmission path, the type information specifying a type of driven position information that can be transmitted by the driven position information transmission means;
a type information reception unit provided to the camera body that receives the type information from the interchangeable lens via the second information transmission path;
a decision unit provided to the camera body that decides, for each of the types of driven position information specified by the type information that has been received, whether or not the driven position information corresponding to the type is required;
a specifying information transmission unit provided to the camera body that transmits specifying information to the interchangeable lens via the second information transmission path, the specifying information specifying the type of driven position information that the decision unit has decided are required; and
a specifying information reception unit provided to the interchangeable lens that receives the specifying information from the camera body via the second information transmission path; and wherein
the driven position information transmission unit transmits the driven position information of the type designated in the specifying information that has been received.

14. A camera system according to claim 13, further comprising:
an automatic focus adjustment unit provided to the camera body that performs automatic focus adjustment of the photographic optical system, and
an actuation member that can set the ON/OFF state of the automatic focus adjustment unit; and wherein
the decision unit decides upon the type of the driven position information that are required, on the basis of the set state of the actuation member.

15. An interchangeable lens that is detachably fitted to a camera body, comprising:
a photographic optical system including a plurality of driven members whose driven state changes;

a driven position information transmission unit that transmits driven position information to the camera body via a first transmission unit according to a clock signal of a first frequency, input from the camera body, the driven position information being related to a position of at least one driven member among the plurality of driven members; and a type information transmission unit that transmits type information to the camera body via a second transmission unit that is different from the first transmission unit, according to a clock signal of a second frequency that is different from the first frequency, input from the camera body, the type information specifying a type of the driven member of which driven position information can be transmitted from the driven position information transmission unit.

* * * * *